United States Patent
Jasper et al.

(10) Patent No.: US 10,378,383 B2
(45) Date of Patent: Aug. 13, 2019

(54) ALIGNMENT APPARATUS FOR COUPLING DIAPHRAGMS OF TURBINES

(71) Applicant: General Electric Company, Schenectady, NY (US)

(72) Inventors: Martin James Jasper, Simpsonville, SC (US); Ajay Gangadhar Patil, Greer, SC (US); Brad Wilson VanTassel, Easley, SC (US)

(73) Assignee: General Electric Company, Schenectady, NY (US)

( * ) Notice: Subject to any disclaimer, the term of this patent is extended or adjusted under 35 U.S.C. 154(b) by 319 days.

(21) Appl. No.: 15/416,038

(22) Filed: Jan. 26, 2017

(65) Prior Publication Data

US 2018/0209303 A1 Jul. 26, 2018

(51) Int. Cl.
*F01D 25/24* (2006.01)
*F01D 9/02* (2006.01)
*F01D 9/04* (2006.01)

(52) U.S. Cl.
CPC ............ *F01D 25/246* (2013.01); *F01D 9/02* (2013.01); *F01D 9/042* (2013.01); *F05D 2220/31* (2013.01); *F05D 2220/32* (2013.01); *F05D 2220/76* (2013.01); *F05D 2230/61* (2013.01); *F05D 2250/292* (2013.01); *F05D 2260/30* (2013.01); *Y02E 20/16* (2013.01)

(58) Field of Classification Search
CPC .......... F01D 25/246; F01D 9/042; F01D 9/02; Y02E 20/16; F05D 2230/61; F05D 2260/30; F05D 2250/292; F05D 2220/76; F05D 2220/32; F05D 2220/31
See application file for complete search history.

(56) References Cited

U.S. PATENT DOCUMENTS

| 2,247,423 | A | * | 7/1941 | Webster, Jr. | .......... F01D 25/246 415/126 |
| 3,836,282 | A | * | 9/1974 | Mandelbaum | .......... F01D 9/042 415/209.4 |
| 4,643,636 | A | * | 2/1987 | Libertini | ................. F01D 5/284 415/138 |
| 4,655,682 | A | * | 4/1987 | Kunz | ..................... F01D 9/042 415/119 |

(Continued)

*Primary Examiner* — Joseph J Dallo
(74) *Attorney, Agent, or Firm* — Dale Davis; Hoffman Warnick LLC (57) ABSTRACT

Various embodiments of the disclosure include an alignment apparatus for assembly alignment and load sharing. The alignment apparatus may include: an alignment pin including a first end and an opposing, second end, wherein the first end is configured to couple with a first hole in a first turbine nozzle diaphragm and the second end is configured to couple with a second hole in a second, adjacent turbine nozzle diaphragm. Embodiments of the disclosure may also include a turbine and a combined-cycle power plant. The turbine may include: a first nozzle diaphragm; and a second, adjacent nozzle diaphragm, wherein the first diaphragm is directly coupled to the second diaphragm. The combined-cycle power plant may include: a steam turbine; a gas turbine; a first nozzle diaphragm within the gas turbine; a second, adjacent nozzle diaphragm within the gas turbine; and an alignment pin coupling the first diaphragm directly to the second diaphragm.

18 Claims, 9 Drawing Sheets

(56) References Cited

U.S. PATENT DOCUMENTS

| | | | | |
|---|---|---|---|---|
| 5,586,864 | A * | 12/1996 | Knorowski | F01D 9/044 415/209.2 |
| 5,788,456 | A * | 8/1998 | Maier | F01D 9/042 29/889.22 |
| 7,329,096 | B2 * | 2/2008 | Tomko | F01D 9/042 415/209.4 |
| 7,654,794 | B2 * | 2/2010 | Burdgick | F01D 9/042 29/525.14 |
| 7,997,860 | B2 * | 8/2011 | Burdgick | F01D 1/02 29/889.22 |
| 8,075,265 | B2 * | 12/2011 | Turzig | F01D 9/042 415/191 |
| 8,632,300 | B2 * | 1/2014 | Rogers | F01D 5/26 415/119 |
| 8,702,385 | B2 * | 4/2014 | Burdgick | F01D 9/02 29/889.22 |
| 8,834,109 | B2 | 9/2014 | Propheter-Hinckley | |
| 2007/0189893 | A1 * | 8/2007 | Burdgick | F01D 25/243 415/213.1 |
| 2013/0022453 | A1 * | 1/2013 | Schaus | F01D 9/041 415/189 |
| 2013/0052024 | A1 | 2/2013 | Brunt et al. | |
| 2014/0314550 | A1 | 10/2014 | Jenkinson et al. | |
| 2017/0292390 | A1 * | 10/2017 | Burdgick | F01D 9/041 |

\* cited by examiner

ALIGNMENT APPARATUS FOR COUPLING DIAPHRAGMS OF TURBINES

FIELD

The disclosure relates generally to turbines, or more specifically, to an alignment apparatus for coupling adjacent diaphragms of turbines and an associated method.

BACKGROUND

Gas turbines typically include a compressor section, a combustion section, and a turbine section. The compressor section pressurizes air flowing into the turbine. The combustion section receives the pressurized air, mixes it with fuel, and combusts the mixture. The turbine section receives the combustion flow from the combustion section to drive the turbine and generate power. During operation of the turbine, various components therein may be subject to creep, thermally induced stresses, and/or stresses caused by uneven loads which can cause the components to become deformed and/or cracked. Significant deformation can lead to loss of efficiency and mechanical failure in some systems. Additionally, deformation can also be caused from components that are not aligned properly during installation or assembly.

BRIEF DESCRIPTION

Embodiments of the disclosure herein may include an alignment apparatus. The alignment apparatus may include: an alignment pin including a first end and an opposing, second end, wherein the first end is configured to couple with a first hole in a first turbine nozzle diaphragm and the second end is configured to couple with a second hole in a second, adjacent turbine nozzle diaphragm.

Embodiments of the disclosure may also include a turbine. The turbine may include: a first diaphragm coupled to a first nozzle; and a second, adjacent diaphragm coupled to a second nozzle, wherein the first diaphragm is directly coupled to the second diaphragm.

Embodiments of the disclosure may also include a combined-cycle power plant. The combined-cycle power plant may include: a steam turbine; a gas turbine; a first diaphragm coupled to a first nozzle within the gas turbine; a second, adjacent diaphragm coupled to a second nozzle within the gas turbine; and an alignment pin coupling the first diaphragm directly to the second diaphragm.

The illustrative aspects of the present disclosure are designed to solve the problems herein described and/or other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION

In the following description, reference is made to the accompanying drawings that form a part thereof, and in which is shown by way of illustration specific example embodiments in which the present teachings may be practiced. These embodiments are described in sufficient detail to enable those skilled in the art to practice the present teachings and it is to be understood that other embodiments may be used and that changes may be made without departing from the scope of the present teachings. The following description is, therefore, merely illustrative.

Where an element or layer is referred to as being "on," "engaged to," "disengaged from," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Figure 1:
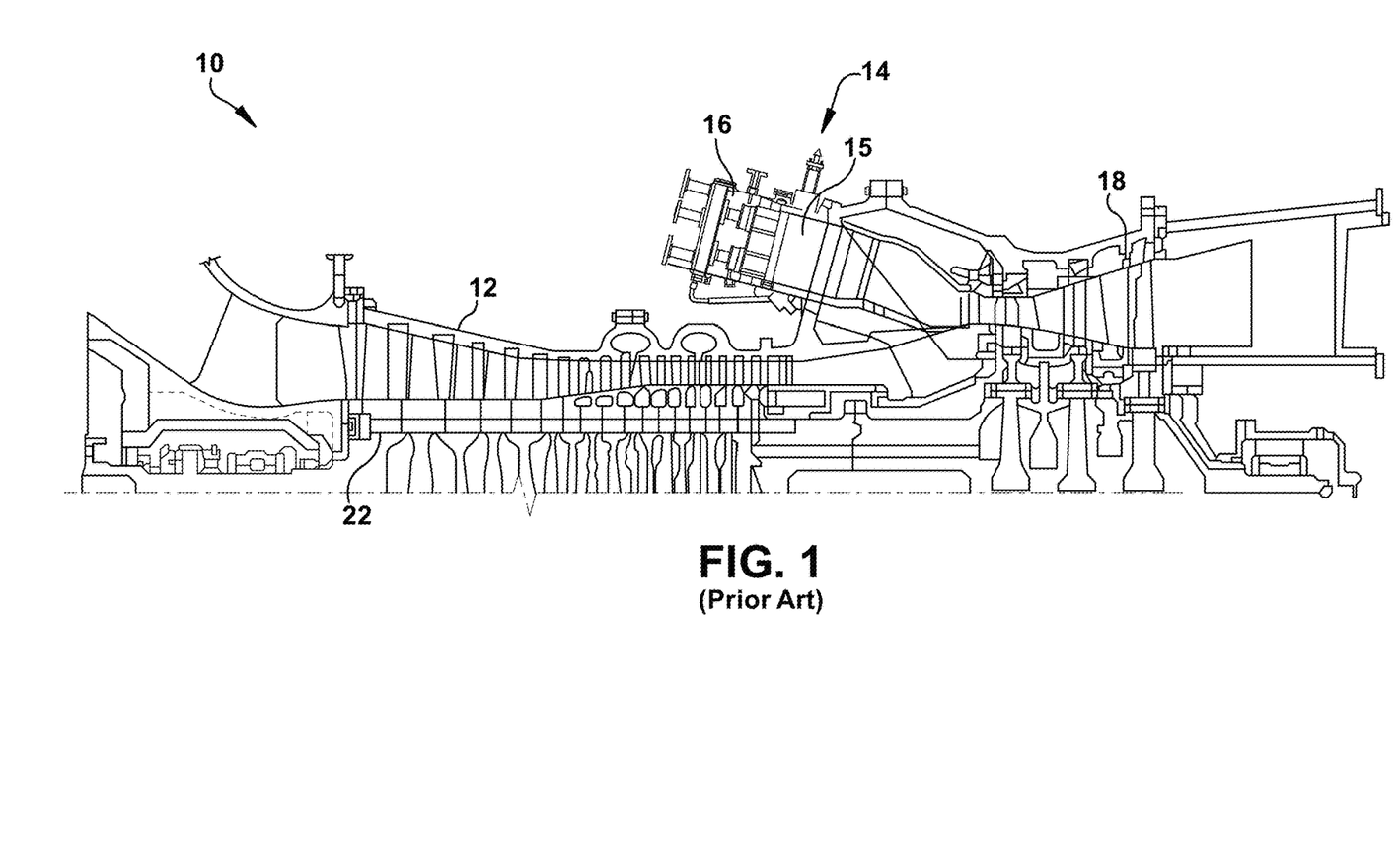
FIG. 1 shows a schematic illustration of an exemplary combustion turbine engine.

FIG. 1 is a schematic illustration of an illustrative combustion turbine engine 10. Engine 10 includes a compressor 12 and a combustor 14. Combustor 14 includes a combustion region 15 and a fuel nozzle assembly 16. Engine 10 also includes a turbine 18 and a common compressor/turbine shaft 22 (sometimes referred to as rotor 22). In one embodiment, engine 10 is a MS7001FB engine, sometimes referred to as a 9FB engine, commercially available from General Electric Company, Greenville, S.C. The present disclosure is not limited to any one particular engine and may be implanted in connection with other engines including, for example, the MS7001FA (7FA) and MS9001FA (9FA) engine models of General Electric Company.

In operation, air flows through compressor 12 and compressed air is supplied to combustor 14. Specifically, the compressed air is supplied to fuel nozzle assembly 16 that is integral to combustor 14. Assembly 16 is in flow communication with combustion region 15. Fuel nozzle assembly 16 is also in flow communication with a fuel source (not shown in FIG. 1) and channels fuel and air to combustion region 15. Combustor 14 ignites and combusts fuel. Combustor 14 is in flow communication with turbine 18 for which gas stream thermal energy is converted to mechanical rotational energy. Turbine 18 is rotatably coupled to and drives rotor 22. Compressor 12 also is rotatably coupled to shaft 22. In the illustrative embodiment, there is a plurality of combustors 14 and fuel nozzle assemblies 16. In the following discussion, unless otherwise indicated, only one of each component will be discussed.

Figure 2:
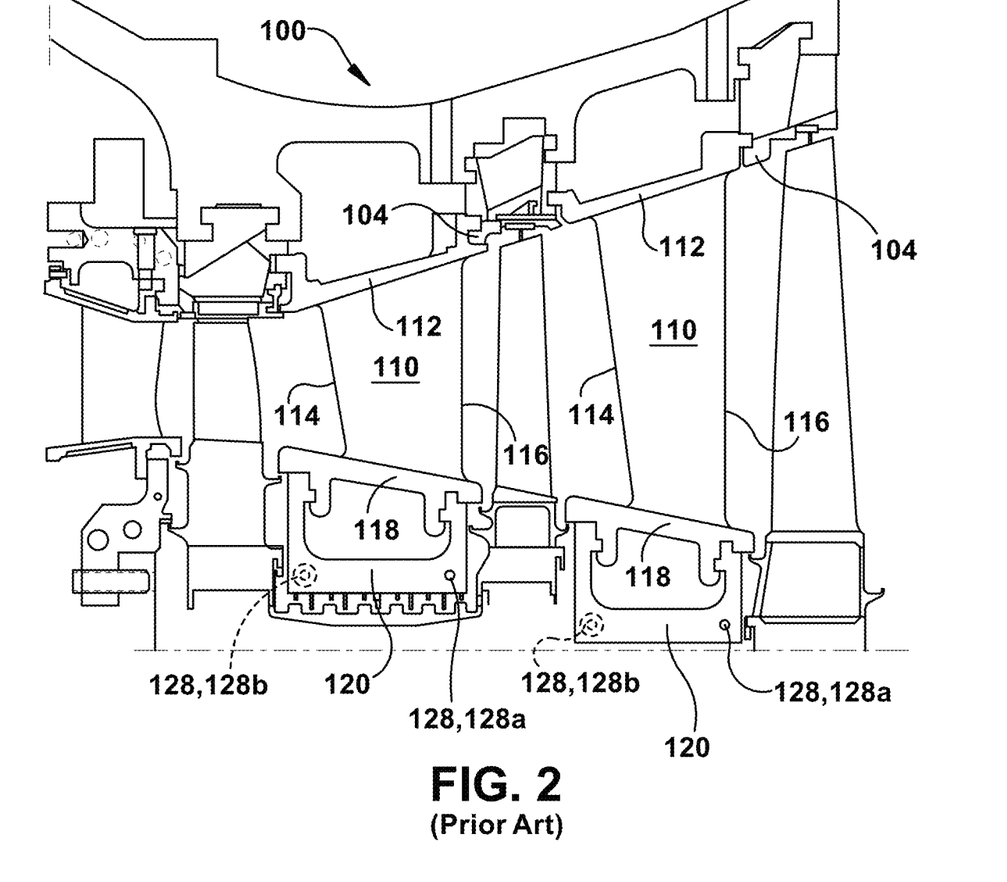
FIG. 2 shows a cross-section illustration of an exemplary gas turbine assembly with a three stage nozzle that may be used with the combustion turbine engine in FIG. 1.

Turning to FIG. 2, a partial cross-sectional view of a portion of a turbine 100 is shown according to embodiments of the disclosure. Turbine 100 may include a rotor 102 (partially shown in FIG. 2) and an outer diaphragm (or shroud) 104 (partially shown in FIG. 2) substantially surrounding rotor 102. A turbine blade 108 may be secured within rotor 102 and located between a set of nozzles 110 coupled to outer diaphragm 104. Nozzles 110 may be coupled to outer diaphragm 104 by inserting an outer platform 112 of nozzles 110 into slots within outer diaphragm 104. Set of nozzles 110 may include a plurality of nozzles 110 which define stages of turbine 100. Nozzles 110 may include a leading edge 114 and a trailing edge 116 as known in the art. Nozzles 110 and turbine blades 108 may radially extend respectively from outer diaphragm 104 and rotor 102, such that nozzles 110 and turbine buckets 108 are interspersed along an axial length of turbine 100. Additionally, each nozzle 110 may include an inner platform 118 coupled within slots within an inner diaphragm 120. A working fluid, such as gas, may be directed to a downstream location, along a working fluid passage (e.g., the main flowpath) through turbine blades 108 and nozzles 110 to assist the rotation of rotor 102. Well shown and described with respect to a gas turbine, aspects of the disclosure are equally applicable to steam turbines.

As shown, inner diaphragm 120 may include holes 128. For example, inner diaphragm 120 may include a hole 128*a* at a trailing edge 116. As shown, hole 128*a* may be a simple or non-countersunk hole. On the opposing side of inner diaphragm 120, e.g., on the side opposing the side of inner diaphragm 120 shown in FIG. 2, inner diaphragm 120 may include a countersunk hole (not shown in FIG. 2) at trailing edge 116. In this embodiment, inner diaphragm 120 may include only two holes 128 on opposing sides of inner diaphragm 120. However, in some embodiments, inner diaphragm 120 may include an optional additional hole 128*b* at an opposing leading edge 114. In this embodiment, hole 128*a* may be a countersunk hole. In this embodiment, inner diaphragm may also include a simple or non-countersunk hole (not shown in FIG. 2) at leading edge 114 on the opposing side of inner diaphragm 120. That is, inner diaphragm 120 may include at least four holes 128 according to this embodiment. At trailing edge 116, inner diaphragm 120 may include a simple or non-countersunk hole 128*a* and a countersunk hole (not shown in FIG. 2) on an opposing trailing edge 116 side. At leading edge 114, inner diaphragm 120 may include a countersunk hole 128*b* and a non-countersunk hole (not shown in FIG. 2) on an opposing leading edge 114 side. It is to be understood that any number and/or configuration of holes 128 may be used without departing from aspects of the disclosure. For example, opposing sides of inner diaphragm 120 at trailing edge 116 may include simple or non-countersunk holes. That is, no countersunk holes may be included. As will be described herein, holes 128 may be configured to matingly engage with an alignment pin 132 (FIG. 5) for directly coupling adjacent inner diaphragms 120.

Figure 3:
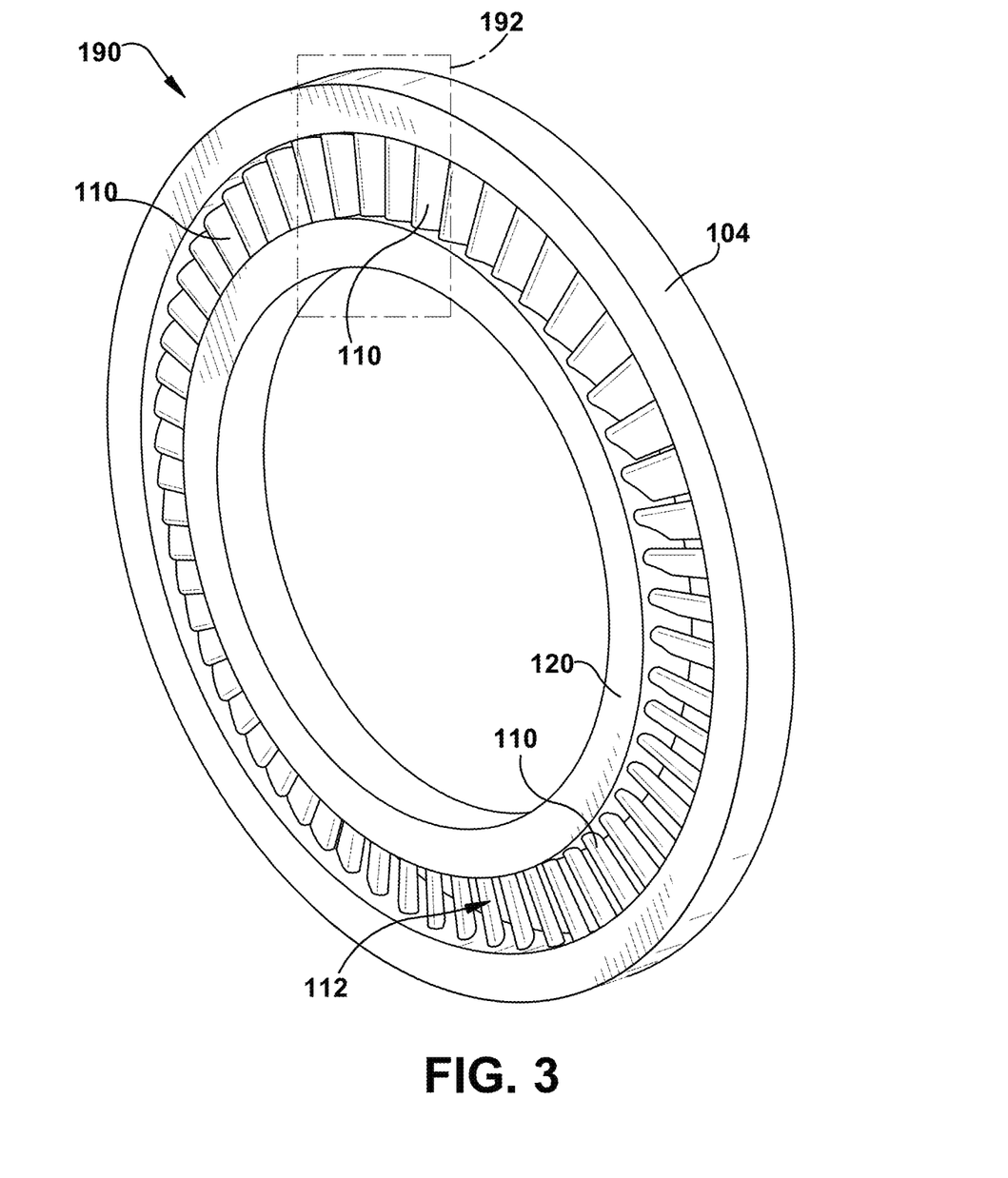
FIG. 3 shows a partial three-dimensional perspective view of a turbine diaphragm system according to an embodiment of the disclosure.

Turning to FIG. 3, a partial three-dimensional perspective view of an embodiment of a turbine diaphragm assembly 190 is shown. In this embodiment, turbine diaphragm assembly 190 includes outer ring diaphragm 104 which is configured to be disposed about a rotor 102 (FIG. 2) within a turbine shell, e.g., a stator (not shown). A set of nozzles 110 may be connected to a radially inboard surface of outer diaphragm 104. Set of nozzles 110 may be oriented circumferentially about outer diaphragm 104 and may extend radially inboard from outer diaphragm 104 and partially define the working fluid passage. Inner diaphragm 120 may be located radially inboard of outer diaphragm 103 and connected to set of nozzles 110. In some embodiments, outer diaphragm 104 may be formed as a uniform component/body (e.g., one element formed from a single piece of material). In another embodiment, outer diaphragm 104 may be formed as an assembly of a plurality of segments which may include any materials now known or later developed. Further, nozzles 110 and inner diaphragm 120 may be formed as an assembly of a plurality of segments each including one or more inner diaphragms 120 and nozzles 110.

Figure 4:
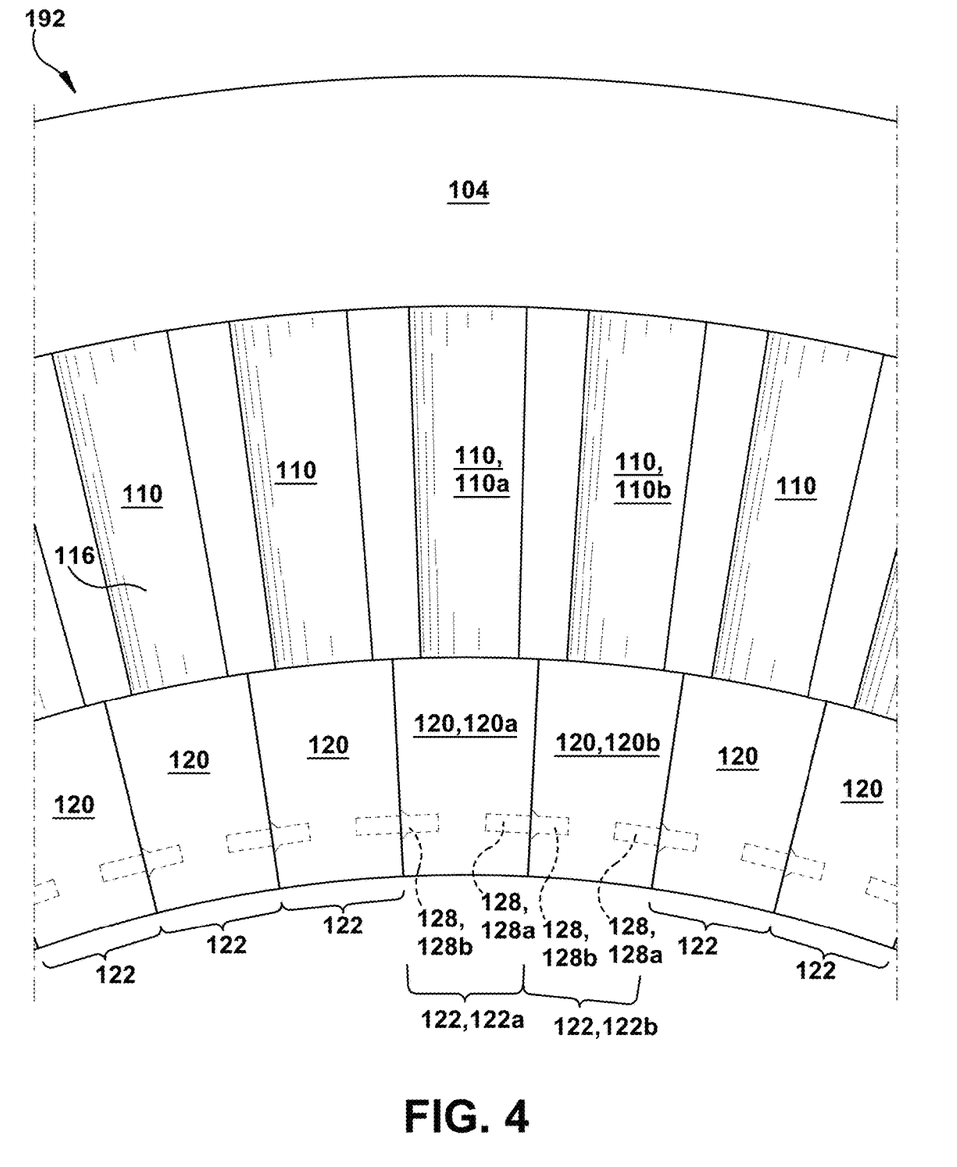
FIG. 4 shows a cross-section of the section in the dotted-lined box of the turbine diaphragm system of FIG. 3.
Figure 5:
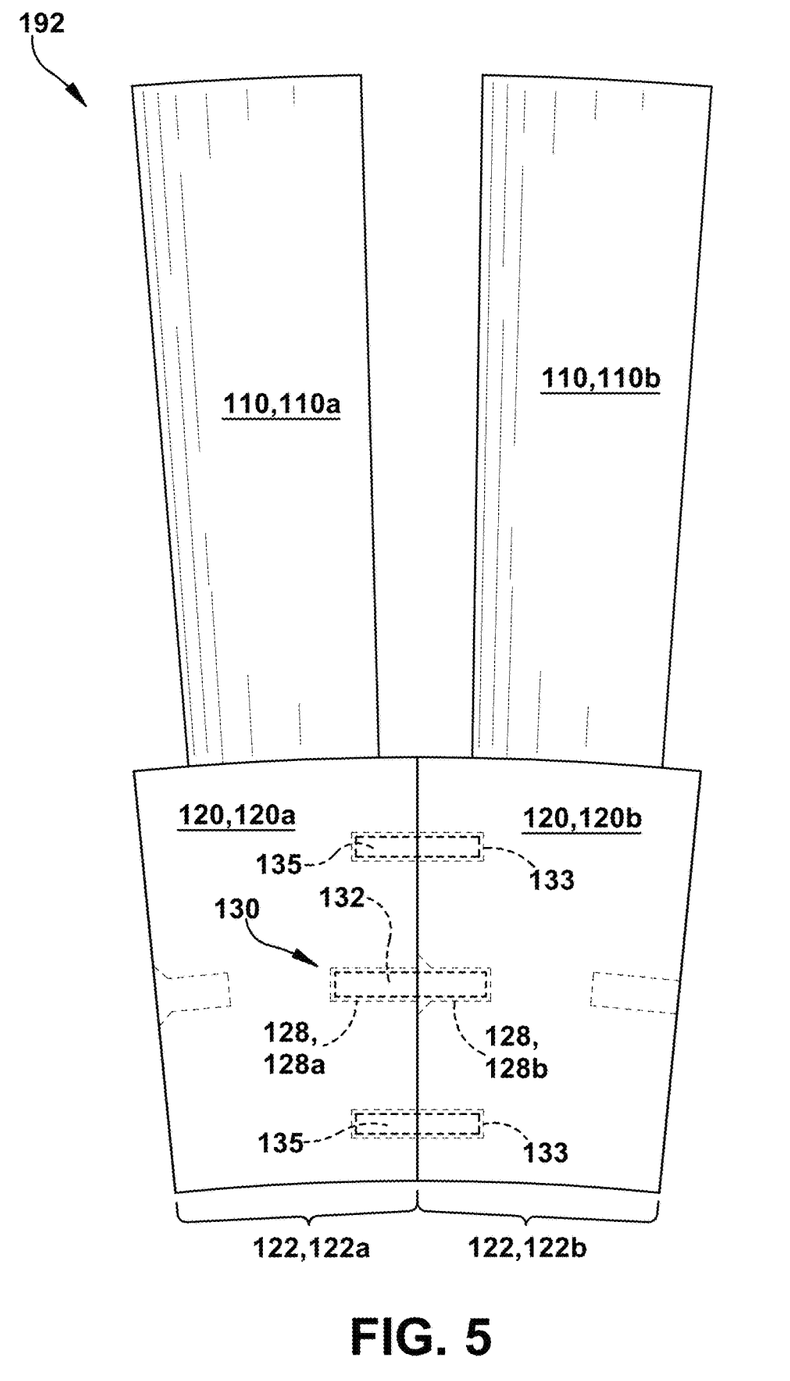
FIG. 5 shows an enlarged cross-section of adjacent diaphragms of FIG. 4.

For example, as shown in FIG. 4, a trailing edge 116 of adjacent segments 122 from section 192 of FIG. 3 are shown. Each segment 122 may include a nozzle 110 coupled with outer diaphragm 104. Further, each segment 122 may include inner diaphragm 120 coupled with each nozzle 110. Adjacent inner diaphragm 120 may be directly coupled to each other to collectively define a continuous inner diaphragm surrounding rotor 102 (FIG. 2). For example, inner diaphragm 120*a* of segment 122*a* may be directly coupled with inner diaphragm 120*b* of segment 122*b*. As shown, each trailing edge 116 of inner diaphragm 120 may include at least two holes 128. More specifically, each diaphragm 128 may include a non-countersunk or simple hole 128*a* and a countersunk hole 128*b*. Holes 128 may configured for receiving an alignment pin 132 (FIG. 5). Further, as described with respect to FIG. 2, inner diaphragms 120 may also include at least two holes at a leading edge 114 (FIG. 2) in some embodiments. While only two holes 128 have been shown at trailing edge 116, it is to be understood that any number of holes may be employed without departing from aspects of the disclosure. Additionally, holes 128 are not limited to being positioned within inner diaphragm 120 as shown in the figures. For example, holes 128 may be positioned within inner diaphragm 120 at any location that can aid in coupling adjacent inner diaphragms. Further, while holes 128 have been described as countersunk or non-countersunk, any shape or configuration of holes may be employed without departing from aspects of the disclosure. For example, as previously noted, only simple or non-countersunk holes may be included in some embodiments. Additionally, in some embodiments, one or more holes 128 may be threaded for threadingly engaging an alignment pin 132 (FIG. 5).

FIG. 5 shows an enlarged view of adjacent segments 122*a*, 122*b* including alignment apparatus 130. Alignment apparatus 130 may include alignment pin 132. As used herein, "alignment pin" may refer to a pin, fastener, dowel, rod, bar, shaft, strip, and/or ingot. Alignment pin 132 may couple inner diaphragm 120*a* to inner diaphragm 120*b*. Alignment pin 132 may include two opposing ends such that each end is positioned within a hole 128 in adjacent inner diaphragms 120. For example, as shown in FIG. 5, alignment pin 132 may be positioned within a simple or non-countersunk hole 128*a* in inner diaphragm 120*a* and within a countersunk hole 128*b* in inner diaphragm 120*b*. Alignment pin 132 may be held in place within holes 128 via an interference fit. Further, during operation of turbine 10 (FIG. 1), alignment pin 132 may be held in place by interference fit caused by thermal expansion of inner diaphragms 120 and/or alignment pin 132. In some embodiments, alignment pin 132 may include a non-destructible material. Alignment pin 132 may include a metal, such as stainless steel. In another embodiment, alignment pin 132 may include a destructible material that combusts, evaporates, melts, sublimes, or burns away during operation of turbine 10 (FIG. 1). The destructible material may include, for example, at least one of: wood, plastic, or a polymer material. As will be described herein, alignment pin 132 may aid in aligning adjacent inner diaphragms 120 and/or sharing loads between adjacent inner diaphragms 120.

Figure 6:
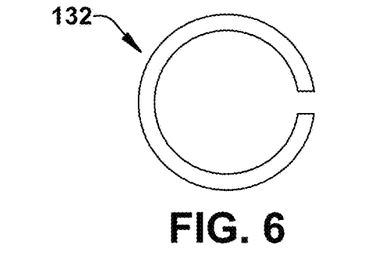
FIGS. 6-11 show examples of alignment pins according to various embodiments of the disclosure.
Figure 7:
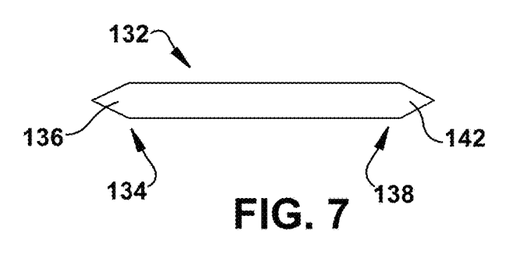
Figure 8:
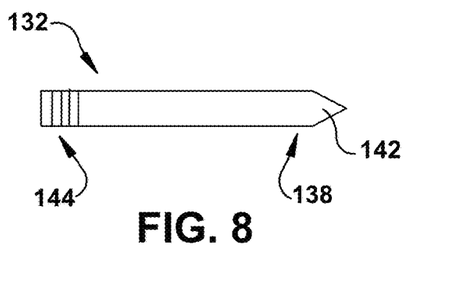
Figure 9:
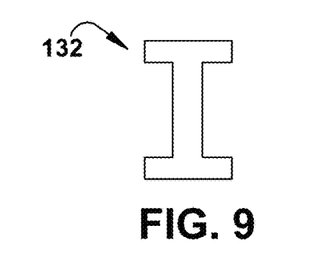
Figure 10:
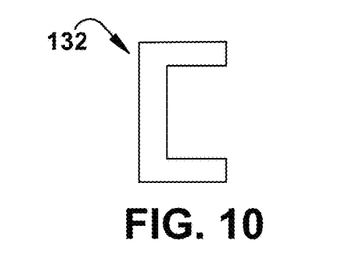
Figure 11:
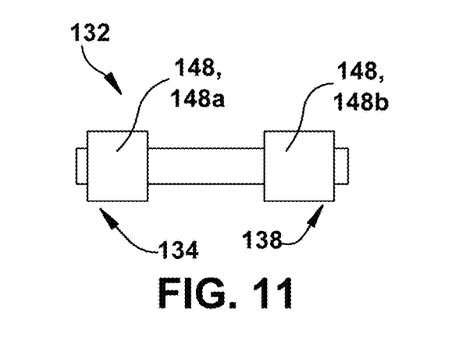

Alignment pin 132 may be of any shape and/or configuration for matingly engaging holes 128. For example, alignment pin 132 may include a spring pin or a split pin as shown in FIG. 6. In another embodiment, alignment pin 132 may include a first end 134 having a first point or tapered tip 136, and a second, opposing end 138 having a second pointed or tapered tip 142 as shown in FIG. 7. In another example, alignment pin 132 may include a first threaded end 144 and an opposing end 138 having a pointed or tapered tip 142 as shown in FIG. 8. Threaded end 144 may be configured for matingly engaging and/or threadingly engaging a threaded hole 128 in an inner diaphragm 120 (FIG. 5). In another example, alignment pin 132 may include at least one of: a polygonal cross-section (not shown), an I-beam cross-section (FIG. 9), or a C-beam cross-section (FIG. 10). The polygonal cross-section may include, for example, a rectangular shape, a triangular shape, or an octagonal shape, etc. In yet another example, one or more retention rings 148 may at least partially surround alignment pin 132. Retention rings 148 may be configured to provide an interference fit of alignment pin 132 with at least one hole 128 (FIG. 5), e.g., countersunk hole 128a and/or non-countersunk hole 128b, in inner diaphragms 120. Retention rings 148 may include, for example, a metal or any destructible material discussed herein. As shown in FIG. 11, one embodiment may include a retention ring 148a on first end 134 and a retention ring 148b on second end 142. In other embodiments, alignment pin 132 may fixed into place, e.g., by welding, joining, and/or staking, within holes 128. Additionally, alignment pin 132 may be forced, e.g., by hitting, pushing, and/or hammering, to caused deformity of alignment pin 132 to cause an interference fit of alignment pin 132 within holes 128. In some embodiments, alignment pin 132 may be hollow, e.g., a hollow dowel, and in other embodiments, alignment pin 132 may be solid, e.g., a solid dowel. It is to be understood, that configuration and/or shape of holes 128 may depend on the desired configuration and/or shape of alignments pin 132, and vice versa. Further, it is to be understood that various combinations of the described embodiments of alignment pin 132 are also contemplated by the disclosure.

Alignment pin 132 may aid in aligning adjacent inner diaphragms 120 during assembly. For example, as shown in FIG. 5, inner diaphragms 120 may include slots 133 for seals 135. During assembly it may be difficult to align slots 133 of adjacent inner diaphragms 120 and as a result, seals 135 within slots 133 may become damaged, bent and/or misshaped. Alignment pin 132 and holes 128 may each have a length extending between adjacent diaphragms 120 that is longer than a length of slots 133 and seals 135. For example, seals 135 may range from approximately 0.3 inches to approximately 1.5 inches in length and alignment pin 132 may range from approximately 0.5 inches to approximately 2.5 inches in length. In this way, alignment pin 132 and seals 135 may be inserted in their respective holes 128 and slots 133 in a first inner diaphragm 120. Since alignment pin 132 is longer than seals 135, alignment pin 132 may be used to align adjacent inner diaphragms 120 by inserting alignment pin 132 within hole 128 of a second, adjacent inner diaphragm 120. By ensuring alignment of alignment pin 132 within holes 128 in inner diaphragms 120, alignment of slots 133 within adjacent inner diaphragms is also ensured.

Alignment pins 132 may be configured to support a load, e.g., an operational load of a nozzle 110 (FIG. 5), of at least one inner diaphragm 120 and provides a means for sharing the load between adjacent and coupled inner diaphragms 120. For example, during operation of turbine 10 (FIG. 1), pressures applied to nozzles 110 may be carried through to inner diaphragms 120 in shear and/or bending. As a result, the load carried by one inner diaphragm 120 may be greater than a load carried by an adjacent inner diaphragm 120. By directly coupling adjacent inner diaphragms 120, the greater load may be evenly dispersed between adjacent inner diaphragms 120.

Figure 12:
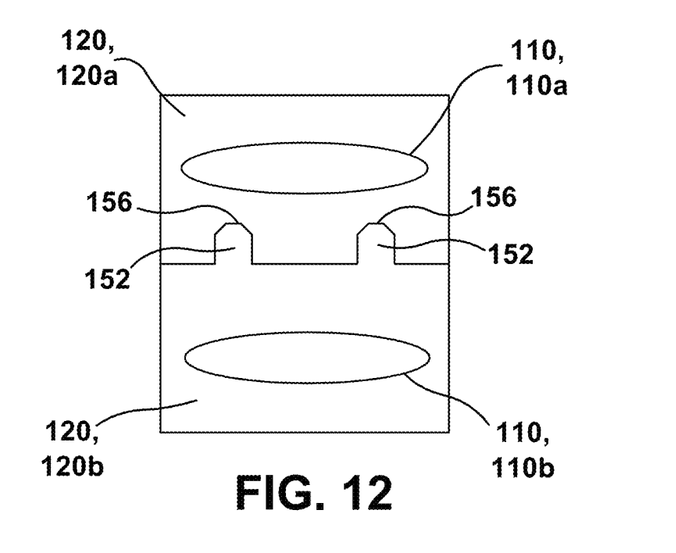
FIGS. 12-13 show cross-sections of examples of interlocking adjacent diaphragms according to embodiments of the disclosure.
Figure 13:
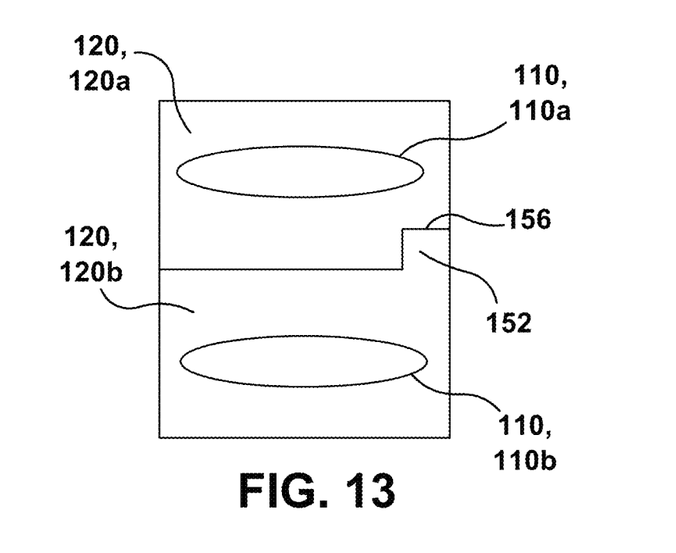

FIGS. 12-13 show top-down views of adjacent inner diaphragms 120 according to another embodiment of the disclosure. Outer diaphragm 104 has been removed from FIGS. 12-13 for clarity. In this embodiment adjacent inner diaphragms 120 are coupled via interlocking as opposed to via alignment pin 132 (FIG. 5). For example, as shown in FIGS. 12-13, inner diaphragm 120b may include one or more projections 152 configured to matingly engage with grooves or recesses 156 of inner diaphragm 120a.

Referring back to FIG. 5, embodiments of the disclosure may also include a method for coupling adjacent inner diaphragms. The method may include providing a first inner diaphragm 120a having a first hole 128a, e.g., a non-countersunk hole, therein. First inner diaphragm 120a may be coupled directly to a first nozzle 110a. A first end of alignment pin 132 may be inserted within first hole 128a. Alignment pin 132 may include any of the alignment pins 132 discussed herein. For example, alignment pin 132 may include a spring pin or split pin as shown in FIG. 6. In another embodiment, alignment pin 132 may include a first end having a first end 134 having a first pointed or tapered tip 136 and a second end 138 having a second pointed or tapered tip 142 as shown in FIG. 7. Further, alignment pin 132 may include a destructible material such as, at least one of: wood, plastic, or a polymer material. In an embodiment where first hole 128a is threaded and alignment pin 132 has a threaded end 144 (FIG. 8), the inserting of alignment pin 132 into first hole 128a may include threadingly engaging threaded end 144 of alignment pin 132 within first hole 128a. In an embodiment where alignment pin 132 includes a cross-sectional shape of at least one of: a polygonal shape, an I-beam shape (FIG. 9), or a C-beam shape (FIG. 10), hole 128b may be of a corresponding polygonal, I-, or C-cross-sectional shape, and alignment pin 132 may be aligned with or inserted within the correspondingly shaped hole 128a. In an embodiment where alignment pin 132 includes at least one retention ring 148 (FIG. 11) substantially surrounding alignment pin 132, retention ring 148 may also be inserted in first hole 128a and provide an interference fit of alignment pin 132 within first hole 128a.

A second inner diaphragm 120b may be provided adjacent to first inner diaphragm 120a. Second inner diaphragm 120b may also include a second hole 128b, e.g., countersunk hole, therein. Further, second inner diaphragm 120b may be directly coupled to a second nozzle 110b. A position of at least one of first inner diaphragm 120a or second inner diaphragm 120*b* may be adjusted such that a second end of alignment pin 132 is inserted into second hole 128*b* of second inner diaphragm 120*b*. In an embodiment, where alignment pin 132 includes a cross-sectional shape of at least one of: a polygonal shape, an I-beam shape (FIG. 9), or a C-beam shape (FIG. 10), hole 128*a* may be of a corresponding polygonal, I-, or C-cross-sectional shape, and alignment pin 132 may be aligned with or inserted within the correspondingly shaped hole 128*b*. In an embodiment where alignment pin 132 includes at least one retention ring 148 (FIG. 11) substantially surrounding alignment pin 132, retention ring 148 may also be inserted in second hole 128*b* and provide an interference fit of alignment pin 132 within hole 128*a*. The adjusting the position of at least one of first inner diaphragm 120*a* or second inner diaphragm 120*b* causes alignment of slots 133 within adjacent inner diaphragms 120 thereby preventing damaging or bending of seals 135 therein. Additionally, the adjusting the position of at least one of first inner diaphragm 120*a* or second inner diaphragm 120*b* may cause a load, e.g., a load of nozzles 110, to be shared between first inner diaphragm 120*a* and second inner diaphragm 120*b*. In an embodiment where alignment pin 132 includes a destructible material, the method may also include combusting, evaporating, and/or burning away alignment pin 132 during operation of turbine 10 (FIG. 1). The method may be repeated for additional adjacent inner diaphragms 120 in diaphragm system 190 (FIG. 3).

As should be clear from the description of the methods herein, alignment pin 132 not only aids in load sharing (shear and/or bending load due to pressures during operation), but also provides for assistance in installation and assembly of nozzles 110 and inner diaphragms 120. In this way, alignment pin 132 ensures alignment of adjacent inner diaphragms 120 and reduces creep deflection and damage caused by creep. Further, while embodiments herein have been described with respect to inner diaphragms, it is to be understood that embodiments of the disclosure are equally applicable to other adjacent components of a turbine.

Figure 14:
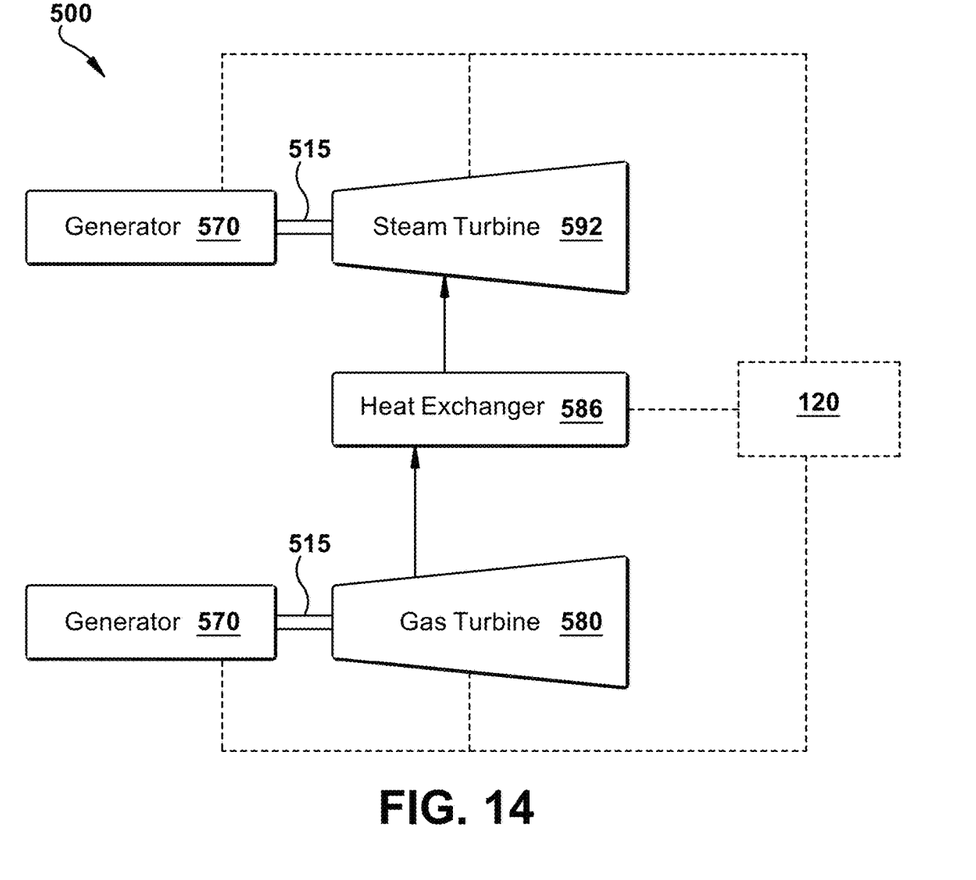
FIG. 14 shows a schematic block diagram illustrating portions of a multi-shaft combined cycle power plant system according to embodiments of the disclosure.
Figure 15:
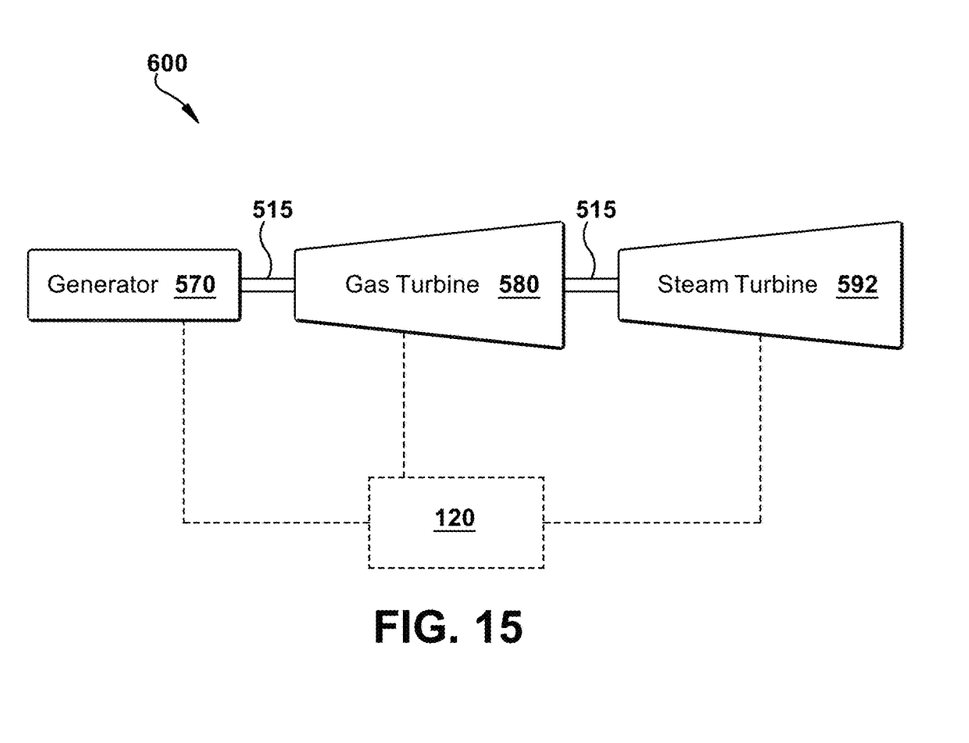
FIG. 15 shows a schematic block diagram illustrating portions of a single-shaft combined cycle power plant system according to embodiments of the disclosure.

Turning to FIG. 14, a schematic view of portions of a multi-shaft combined cycle power plant 500 is shown. Combined cycle power plant 500 may include, for example, a gas turbine 580 operably connected to a generator 570. Generator 570 and gas turbine 580 may be mechanically coupled by a shaft 515, which may transfer energy between a drive shaft (not shown) of gas turbine 580 and generator 570. Also shown in FIG. 14 is a heat exchanger 586 operably connected to gas turbine 580 and a steam turbine 592. Heat exchanger 586 may be fluidly connected to both gas turbine 580 and a steam turbine 592 via conventional conduits (numbering omitted). Gas turbine 580 and/or steam turbine 592 may include adjacent coupled inner nozzle diaphragms according to embodiments discussed herein. Heat exchanger 586 may be a conventional heat recovery steam generator (HRSG), such as those used in conventional combined cycle power systems. As is known in the art of power generation, HRSG 586 may use hot exhaust from gas turbine 580, combined with a water supply, to create steam which is fed to steam turbine 592. Steam turbine 592 may optionally be coupled to a second generator system 570 (via a second shaft 515). It is understood that generators 570 and shafts 515 may be of any size or type known in the art and may differ depending upon their application or the system to which they are connected. Common numbering of the generators and shafts is for clarity and does not necessarily suggest these generators or shafts are identical. In another embodiment, shown in FIG. 15, a single shaft combined cycle power plant 990 may include a single generator 570 coupled to both gas turbine 580 and steam turbine 592 via a single shaft 515. Steam turbine 592 and/or gas turbine 580 may include adjacent coupled inner nozzle diaphragms according to embodiments discussed herein. The systems and devices of the present disclosure are not limited to any one particular turbine, power generation system or other system, and may be used with other power generation systems and/or systems (e.g., combined cycle, simple cycle, nuclear reactor, etc.).

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An alignment apparatus for a turbine, the alignment apparatus comprising:
    an alignment pin including a first end and an opposing, second end,
    wherein the first end of the alignment pin is configured to couple with a first hole in a first turbine nozzle diaphragm segment, the first turbine nozzle diaphragm segment including a first nozzle, and wherein the second end of the alignment pin is configured to couple with a second hole in a second, adjacent turbine nozzle diaphragm segment, the second turbine nozzle diaphragm segment including a second nozzle,
    wherein the first turbine nozzle diaphragm segment is directly coupled to the second turbine nozzle diaphragm segment by the alignment pin.

2. The alignment apparatus of claim 1, wherein the alignment pin includes a destructible material that combusts, melts, sublimes, evaporates, or burns away during operation of the turbine.

3. The alignment apparatus of claim 1, wherein the alignment pin includes a spring pin or split pin.

4. The alignment apparatus of claim 1, wherein the alignment pin includes a non-destructible material with at least one end including a tapered tip.

5. The alignment apparatus of claim 1, wherein the alignment pin is configured to support a operational load of at least one of: the first turbine nozzle diaphragm segment or the second turbine nozzle diaphragm segment.

6. A turbine comprising:
a first diaphragm segment coupled to a first nozzle; and
a second, adjacent diaphragm segment coupled to a second nozzle,
wherein the first diaphragm segment is directly coupled to the second diaphragm segment by an alignment pin;
a first hole in the first diaphragm segment; and
a second hole in the second diaphragm segment;
wherein the alignment pin is positioned within the first hole in the first diaphragm segment and the second hole in the second diaphragm segment, the alignment pin including a solid dowel.

7. The turbine of claim 6, wherein the alignment pin includes at least one end having a tapered tip.

8. The turbine of claim 6, wherein at least one of the first hole in the first diaphragm segment or the second hole in the second diaphragm segment is threaded and wherein the alignment pin includes at least one threaded end for matingly engaging with the at least one of the first hole in the first diaphragm segment or the second hole in the second diaphragm segment.

9. The turbine of claim 6, wherein the first hole in the first diaphragm segment comprises a countersunk hole and a non-countersunk the second hole in the second diaphragm segment comprises a non-countersunk hole, and wherein the alignment pin is positioned within the countersunk hole in the first diaphragm segment and the non-countersunk hole in the second diaphragm segment.

10. The turbine of claim 9, wherein the alignment pin includes a spring pin or split pin.

11. The turbine of claim 9, wherein the alignment pin includes a destructible material that is configured to combust during operation of the turbomachine.

12. The turbine of claim 9, wherein the alignment pin includes a first end having a first tapered tip and a second, opposing end having a second tapered tip.

13. The turbine of claim 9, wherein the alignment pin includes at least one of a polygonal cross-section, an I-beam cross-section, or a C-beam cross-section.

14. The turbine of claim 9, wherein the alignment pin is configured to support a load of at least one of: the first diaphragm segment or the second diaphragm segment.

15. A combined-cycle power plant comprising:
a steam turbine;
a gas turbine;
a first diaphragm segment coupled to a first nozzle within the gas turbine;
a second, adjacent diaphragm segment coupled to a second nozzle within the gas turbine;
an alignment pin coupling the first diaphragm segment directly to the second diaphragm segment;
a first hole in the first diaphragm segment; and
a second hole in the second diaphragm segment;
wherein the alignment pin is positioned within the first hole in the first diaphragm segment and the second hole in the second diaphragm segment.

16. The combined-cycle power plant of claim 15, wherein the first hole in the first diaphragm segment comprises a countersunk hole and the second hole in the second diaphragm segment comprises a non countersunk hole, wherein the alignment pin is positioned within the countersunk hole in the first diaphragm segment and the non-countersunk hole in the second diaphragm segment, and wherein the alignment pin includes a spring pin or a split pin.

17. The combined-cycle power plant of claim 15, wherein the alignment pin includes a destructible material that is configured to combust during operation of the turbomachine.

18. The combined-cycle power plant of claim 15, wherein the first hole in the first diaphragm segment and the second hole in the second diaphragm segment each comprise a simple hole,
wherein the alignment pin is positioned within the simple hole in the first diaphragm segment and the simple hole in the second diaphragm segment, and wherein the alignment pin includes a solid dowel having opposing tapered tips.

* * * * *